(12) United States Patent
Leivesley

(10) Patent No.: US 7,861,637 B2
(45) Date of Patent: * Jan. 4, 2011

(54) PRESSURE IMPULSE MITIGATION

(75) Inventor: Sally Leivesley, Auckland (NZ)

(73) Assignee: Flexiblast Pty Ltd, Wooloongabba, Queensland (AU)

(*) Notice: Subject to any disclaimer, the term of this patent is extended or adjusted under 35 U.S.C. 154(b) by 1136 days.

This patent is subject to a terminal disclaimer.

(21) Appl. No.: 10/580,402

(22) PCT Filed: Nov. 24, 2004

(86) PCT No.: PCT/GB2004/004952

§ 371 (c)(1),
(2), (4) Date: Aug. 11, 2006

(87) PCT Pub. No.: WO2005/052500

PCT Pub. Date: Jun. 9, 2005

(65) Prior Publication Data

US 2007/0077835 A1    Apr. 5, 2007

(30) Foreign Application Priority Data

Nov. 24, 2003 (GB) ................... 0327310.9

(51) Int. Cl.
*F41H 5/02* (2006.01)
*C08L 89/00* (2006.01)
(52) U.S. Cl. .................... 89/36.02; 442/135
(58) Field of Classification Search ............ 442/135; 89/36.02, 36.04, 36.05; 106/160.1; 428/920, 428/921
See application file for complete search history.

(56) References Cited

U.S. PATENT DOCUMENTS

| | | | |
|---|---|---|---|
| 3,398,007 | A | 8/1968 | Pillersdorf et al. |
| 3,818,234 | A | 6/1974 | Atkins et al. |
| 4,102,807 | A | 7/1978 | Iwama et al. |
| 4,246,146 | A | 1/1981 | Wood et al. |
| 4,331,547 | A | 5/1982 | Stotts et al. |
| 4,994,317 | A | 2/1991 | Dugan et al. |
| 5,124,208 | A | 6/1992 | Bolton et al. |
| 5,223,313 | A | 6/1993 | Holzer et al. |
| 5,225,236 | A | 7/1993 | Keusch et al. |
| 5,394,786 | A | 3/1995 | Gettle et al. |
| 5,496,640 | A | 3/1996 | Bolton et al. |
| 5,698,277 | A | 12/1997 | Schueller et al. |

(Continued)

FOREIGN PATENT DOCUMENTS

DE    35 06 132 A1    8/1986

(Continued)

OTHER PUBLICATIONS

Thesis submitted to the faculty of Drexel University by Jovan M. Jovicic Apr. 2003.

(Continued)

*Primary Examiner*—Arti Singh-Pandey
(74) *Attorney, Agent, or Firm*—Nixon & Vanderhye P.C.

(57) ABSTRACT

This invention concerns the use of water gels, i.e. mixtures of gels and water in pressure impulse mitigation, e.g. blast mitigation or to prevent damage caused by projectiles. Such water gels have been found to resist over pressures and being aqueous also have applications in the prevention of fire.

9 Claims, 7 Drawing Sheets

U.S. PATENT DOCUMENTS

| | | | |
|---|---|---|---|
| 6,136,216 A | 10/2000 | Fidler et al. | |
| 6,469,129 B1 | 10/2002 | Cook et al. | |
| 6,485,446 B1 | 11/2002 | Brother et al. | |
| 6,560,787 B2 | 5/2003 | Mendoza | |
| 7,019,459 B2 | 3/2006 | Mieda et al. | |
| 7,294,348 B2 | 11/2007 | Lopatin | |
| 2003/0004247 A1 | 1/2003 | Destandau et al. | |
| 2008/0229969 A1* | 9/2008 | Green et al. | 106/16 |

FOREIGN PATENT DOCUMENTS

| | | | |
|---|---|---|---|
| DE | 102 37 395 A1 | | 8/2003 |
| EP | 0 192 249 A3 | | 8/1986 |
| EP | 0 352 069 | * | 1/1990 |
| EP | 0 875 492 A1 | | 11/1998 |
| GB | 1 361 504 | | 7/1974 |
| GB | 2 100 845 A | | 1/1983 |
| GB | 2 262 885 A | | 7/1993 |
| GB | 2 301 122 A | | 11/1996 |
| JP | 5-254896 | | 10/1993 |
| WO | 02/08139 A2 | | 1/2002 |
| WO | WO 03/101234 A2 | | 12/2003 |
| WO | 2004/044520 A1 | | 5/2004 |
| WO | WO 2005/042600 A2 | | 5/2005 |
| WO | WO 2005/100903 A1 | | 10/2005 |

OTHER PUBLICATIONS

International Search Report of PCT/GB2004/004952, mailed Apr. 12, 2005.

GB Search Report of GB 0327310.9, dated Jun. 24, 2004.

Smith et al; "The Use of Alcohol Resistant-Aqueous Film Forming Foam (AR-AFFF) Delivered with a Compressed Air Foam System (CAFS) as a Blast Mitigant", The Journal of Explosives Engineering, pp. 18-19, 22-23.

Burky, "The Suppression of Blast Effects from Large Vehicle Bombs, EOD Operations and Demilitarization Ranges", Presented at the World EOD Foundation Conference, Esher, UK, Nov. 1999.

Burky, "The Reduction to Practice of the Blast Effects Suppression System, HydroSuppressor™", Final Report on Battelle Columbus Operations FY 1999, Independent Research and Development, Sep. 30, 1999.

Knox et al., "Polymer Materials for Structural Retrofit".

* cited by examiner

IMPACT PATHWAY OF HIGH VELOCITY BULLET THROUGH 30% w/v GELATIN GEL / WITH HDPE SHIELD

PRESSURE IMPULSE MITIGATION

This application is the US national phase of international application PCT/GB2004/004952, filed 24 Nov. 2004, which designated the U.S. and claims priority of GB 0327310.9, filed 24 Nov. 2003, the entire contents of each of which are hereby incorporated by reference.

This invention relates to a new material to be used as a pressure mitigant, e.g. as a protective barrier on or in place of windows. In particular, the invention relates to the use of water gels to form a material which can mitigate the consequences of an explosion.

Since the mid 1990's there has been an increase in the use of explosives by criminal organizations against civilian and military targets throughout the World. Their use results in death, injury and destruction of property and buildings. Previously, mitigation of explosion relied upon intelligence and police detection to provide warning of impending attack but recent events make it clear that intelligence and police operations alone cannot be relied upon to prevent explosions. Moreover, some explosions are caused simply by accident, e.g. gas or chemical explosions, and it would be useful if the consequences of such accidental explosions could also be minimised.

Conventional construction can give rise to buildings which will withstand many types of impact but it is still difficult to minimise the effects of explosions. Of particular importance and concern are the windows especially in high rise buildings. Windows are a major cause of trauma and injury caused by explosions; the fragmentation of pieces of glass not only causes death but many other permanent injuries such as loss of eyesight, organ trauma etc.

It is well known therefore for buildings and in particular windows to be protected against explosion damage by materials which mitigate their effects.

One option for minimising the problem of glass fragmentation utilises an adhesive film made of a polyester composite material which can be applied to the inside of a window to contain glass fragments. Such films do not however prevent injury caused by fragments of masonry from cladding or from fragments falling from a height.

Certain other elastomeric polymer materials have been suggested for use as building cladding to prevent damage caused by explosions. The elastomer material is a highly ductile polymer that can be sprayed onto building surfaces including windows to prevent injury caused both by flying glass and masonry. The polymer employed is based on a polyurea and may be suitable for use with temporary structures as well as concrete buildings (Polymer materials for structural retrofit, Knox et al, Air Force Research Laboratory). The polymer is not transparent however and its use on windows is not desirable and experiments using the polymer have not shown a reduction in pressure effects inside a building.

There are a number of reports of conventional fire fighting foams being employed as pressure mitigants (Journal of Explosives Engineering, Vol 26, No. 3, 1999). Such foams have the additional advantage of preventing fires often associated with explosions. However, the use of these foams requires that the explosive can be surrounded by the foam in a contained environment. Whilst this is possible when the source of an explosion is identified, where an explosion occurs without warning these foams cannot be used. Nor do these foams allow access to an explosive source by persons working to mitigate an accident or defuse a device controlled by criminals.

A somewhat similar system is sold under the trade name Hydrosuppressor. The system involves spraying the explosive or spraying the area in the vicinity of the explosive with water from various angles. Again however, this technique relies on the identification of an existence of a threat of an explosion prior to any explosion taking place.

A more conventional pressure protection system involves coating windows with a woven fabric mesh which acts to catch fragments of glass during any explosion. However, the mesh necessarily obscures the view through the window since it is not transparent. Moreover, the material does not cause any reduction in primary pressure within a building and hence offers no protection against direct pressure effects.

Recently, pressure impulse mitigation has been significantly improved by the use of blast net curtains and by the retrofitting of laminated glass. However, whilst net curtains provide some protection against fragmentation from glass they do not protect building integrity. Also, laminated glass cannot be used higher than about 7 storeys since it falls in total window size, i.e. does not fragment. This is potentially lethal to those in the street below.

There remains a need therefore for novel classes of pressure mitigation materials to be designed, which overcome the limitations of any of the present generation of such materials including but not limited to those described herein, and in particular to provide protection against zero warning explosions. Moreover, with the increase in criminal activity, the use of pressure impulse mitigation materials in construction may become common place and hence there remains a need to devise cheap, non-toxic materials for pressure impulse mitigation.

The present inventors have surprisingly found that mixtures of water and gels (from hereon water gels) are particularly suitable for use in barriers/shields to prevent damage caused by explosions. The inventors have surprisingly found that water gels can be formed into structures which can withstand significant over-pressures compared with materials currently used in buildings. Without wishing to be limited by theory, it is envisaged that the inherent elasticity of the water gel makes it an excellent material for absorbing the shockwave of an explosion. Moreover, the aqueous nature of the water gel ensures that it is also capable of resisting heat and quenching flame, in particular in the immediate aftermath of an explosion.

In addition, it has surprisingly been found that the water gels mitigate damage caused by projectiles such as shrapnel or bullets. The water gels are able to absorb the shockwave created by the projectile through their elasticity whilst also acting to slow and potentially stop the projectile via friction effects throughout the water gel bulk. The water gels therefore also serve to protect against damage from projectiles.

SUMMARY OF INVENTION

Thus, viewed from one aspect the invention provides the use of a water gel in pressure impulse mitigation, e.g. blast mitigation or mitigating the effects of a projectile.

Viewed from another aspect the invention provides a method for protecting an entity, e.g. a structure or organism, from the effects of an explosion or from the effects of contact with a projectile comprising covering at least a part, preferably at least 10% thereof, e.g. all of said entity in a barrier comprising a water gel.

DETAILED DESCRIPTION OF THE INVENTION

By pressure impulse mitigation is meant, inter alia, that at least one of the effects, preferably all of the effects of an explosive blast, e.g. fragmentation or collapse of buildings or glass, translation of objects within the building and primary and secondary effects of fire are reduced.

Pressure impulse mitigation also covers mitigating the effects of contact with a projectile, i.e. mitigating the potential damage caused by a projectile. The projectile may be, for example, a bullet, missile, shrapnel, space debris etc.

By entity is meant anything which should be protected from the impact of an explosion or from damage by a projectile, e.g. structures, organisms and the general physical environment.

An organism is a living plant or animal, e.g. a human. By structure is meant any inanimate object which could be protected from explosive damage such as buildings (temporary or permanent), industrial plant, civil infrastructure, vehicles, military equipment, computers etc.

By water gel is meant a mixture of water and a gel which forms a solid elastomeric barrier. The gel should preferably be non-toxic and cheap to manufacture or isolate. It should exhibit elastomeric properties, have a high elastomeric modulus and a high ductility.

Suitable gels include gelatin, gellan gum gels, poly (gamma-benzyl-L-glutamate) (PBLG), agar (preferably composed of 70% agarose, a gelsaccharide and 30% agaropectin), collagen, protein gels, polysaccharide gels, keratin gels, hydrogels, ormosils (organically modified silicates often of formula $(R'_n Si(OR)_{4-n}$ in which R is typically an alkyl group and R' an organic group), sol-gels, hydrophilic polymer gels, and glycoprotein gels. Other suitable gels include biogels such as carrageenans, pectins, alginates (e.g. xanthan alginates casein), seed gums, egg protein g and Gelacrimide gels. Mixtures of gels can be empolyed.

These gels can be obtained from commercial sources. A preferred gel is gelatin. Viewed from a still further aspect therefore, the invention provides a barrier, e.g. for a window, comprising water and gelatin, wherein the concentration of gel in the water is at least 3% w/w and it preferably has a thickness of at least 5 mm.

The gelatin preferably has a molecular weight range of 20,000 to 300,000 D, e.g. 20,000 to 150,000 D and can be made from the hydrolysis of collagen.

The water gels of the invention should preferably have an elastic modulus in the range of 100 to 1000 kPa, preferably 120 to 900 kPa, more preferably 300 to 800 kPa, e.g. 700 to 800 kPa.

Another property of the water gel is its stress relaxation, with values in the range 0.05 to 0.3 kPa being preferred. Higher stress relaxation values indicate an increased ability to withstand impulse pressure.

The mixture of water and gel can comprise at least 3%. by weight of the gel, preferably at least 4% by weight gel, especially at least 5% by weight gel, up to the limit of solubility of the gel in water, e.g. between 3% by weight and 40% by weight of gel, or in the range 4% by weight to 25% by weight gel, e.g. 5 to 10% wt.

Mixing of the water and gel can be achieved by any convenient means, preferably with stirring or sonication to ensure complete mixing. Thus, the hot gel can be mixed with water in a mould and allowed to cool to form the water gel elastomeric barrier of the invention. The water used may be deionised or distilled if desired but this is not essential. Other sources of water such as tap water are also employable. The resulting mixture is suitable for use as a protective barrier.

The water gels are inherently non-flammable, cheap and non-toxic making them very attractive building materials.

The water gel mixture can be formed into sheets to provide barriers which mitigate the effects of explosion or the effects of contact with a projectile. There is a close relationship between the concentration of gel within a barrier, the thickness of the barrier and its performance, e.g. as a pressure impulse mitigant. The skilled person will be able to tailor concentrations and thicknesses to prepare sheets having desired properties.

The thickness of a protective barrier or sheet may vary depending on the nature of the barrier, e.g. whether it is being used to protect windows, personnel, buildings etc. However, suitable thicknesses are in the range 0.1 cm to 1 m, e.g. 1 to 50 cm such as 1 cm to 20 cm, preferably 2 cm to 10 cm.

Suitable thicknesses for barriers to be used in building cladding are in the range of 10 to 100 mm preferably 10 to 20 mm. Where the material is used to cover windows suitable thickness is in the range of 10 to 50 mm. When the material is used in clothing suitable thickness is in the range of 10 to 70 mm.

When used to protect against high velocity bullets; thicknesses may be of the order of 15 to 30 cm.

In general, it is believed that a 2 cm depth of 10% wt gelatin and water will withstand 45 kPa in blast pressure.

In order to protect the barrier material against degradation by, for example, bacteria or light it may be essential to mix the water gels with antibacterials (e.g. sodium azide) or proteinase inhibitors such as EDTA (e.g. at 5 mM concentration), detergents and/or antioxidants as additives in the water gel formulations. Other additives include colouring agents to produce a tinted product, emulsifiers, viscosity modifiers, organic additives (such as xanthum gum, starch), inorganic additives (such as sodium sulphate, calcium salts, magnesium sulphate, ammonium sulphate) can be employed.

Thus, the water gel layer in the barrier of the invention should preferably comprise at least 50% by weight of water gel, more preferably at least 80% by weight, especially at least 95% by weight of water gel, e.g. 98% wt. Ideally, the water gel layer should consist essentially of water and gel (i.e. incorporates only minor quantities of impurities or standard additives) or consists of water and gel.

In general, the water gel barrier of the invention is an insulator although it can comprise conductive materials if required. In the aftermath of an explosion, the fact that the material is an insulator may prevent electrical fires starting and may prevent electrocution of individuals.

The protective barrier of the invention may also comprise multiple layers. Layers of water gel can therefore be mixed with other layers of water gel with differing concentrations of gel and/or with other pressure mitigating materials to form composites. In one embodiment therefore, the method of the invention may involve a barrier comprising a number of layers of water gel. Moreover, in such a design, the outside water gel layer may have the highest concentration of gel with decreasing lower concentrations of gel on the inside of the barrier.

In a preferred embodiment, the water gel layer or layers is combined with at least one non water gel layer for example a polymer layer (e.g. a polyethylene (HDPE), polypropylene or polycarbonate layer), a metal layer (aluminium or steel), a fabric layer (cotton), a ceramic layer, a fibreglass layer, a dilatant layer (polyethylene oxide layer or a silicone layer) or mixtures of such layers.

A dilatant is a material which thickens upon applied shear stress, e.g. may turn solid upon applied shear stress and examples thereof are polyethylene oxides and silicones.

This forms a further aspect of the invention and viewed from a further aspect the invention provides a barrier, e.g. to protect against the effects of an explosion or from the effects of contact with a projectile comprising a water gel layer and a polymer layer, a metal layer, a fabric layer, a ceramic layer, a fibreglass layer, a dilatant layer or mixtures of such layers.

The composite structure could of course contain a number of water gel layers and/or a number of other layers depending on the properties desired. Where fabric layers are used, it may be necessary to use a number of such layers in view of their narrow thickness. Thus, a multilayer barrier of use in the invention may comprise 2 to 20 layers, e.g. 3 to 10 layers.

Where a multilayer structure is employed it is preferred if the layers are in contact with each other, i.e. there are no gaps between the layers.

The thickness of additional layers can of course vary depending on the nature of the material involved. Suitable thicknesses range from 0.1 to 20 cm.

It has been surprisingly found that the pressure mitigation properties of the water gels of the invention can be especially enhanced by the addition of a layer of polyethylene oxide e.g. an at least 0.5 wt % solution thereof, preferably at least 1% wt solution thereof. This layer should preferably be positioned outside the water gel layer, i.e. will be contacted by the pressure wave/projectile first. The layer may be 0.1 to 1 cm in thickness.

This forms a further aspect of the invention and viewed from a further aspect the invention provides a barrier, e.g. to protect against the effects of an explosion or damage by a projectile, comprising a water gel layer and a polyethylene oxide layer.

A further preferred combination is a polyethylene layer and water gel layer, in particular where the polyethylene layer is wetted by the water gel, i.e. these layers are in physical contact. Suitable polyethylenes are ethylene homopolymers or copolymers with propene.

Layers of fire retardant material, layers of material impervious to chemicals, radioactivity or biological agents could also be added to the barriers of the invention.

All layers of the protective barrier can be encapsulated in a suitable container if required, e.g. a polymer container such as a polypropylene container, for ease of transport and storage, although this is not essential.

In fact a further advantage of the invention is that the material itself can be transported in non-aqueous form, e.g. powder form, and made up to the water gel when required. A potential difficulty with the water gels may be their weight but the fact that the material can be transported as a powder and made into the water gel only when required is a major advantage.

Such a multilayered composition could have important applications in the military and for the general public close to industrial sites such as chemical storage facilities, nuclear reactors or research laboratories or areas where transportation of hazardous materials occurs. Such compositions could be used in clothing to protect against, fire, explosion, projectile damage and the threat of chemical, biological or radiological contamination. The material may also act as a suppressant to chemical contamination by interacting with any aqueous soluble chemical to reduce the toxicity of the chemical.

The material of the invention may also provide therefore a barrier to chemical or biological contamination, e.g. as the result of a criminal attack or chemical leak. The surface of the water gel material is inherently sticky and hence biological and chemical compounds may attach to the surface of the material thereby preventing further contamination taking place. Water soluble agents may dissolve in the water gel barrier. Organic agents are insoluble in the water gel and will therefore be repelled.

Additionally the water gel material acts as a barrier that, unlike most open weave material, prevents biological materials under the size of 5 microns from passing through to the surface of a material below.

The water gels may also have applications in environments where sterility is required, e.g. in hospitals or laboratories. The water gel could aid in preventing infection e.g. when used as a coating agent in a treatment room which can easily be removed and replaced when necessary.

The water gel material may also act as a barrier to alpha and beta particles of radiation that may be present in sources used in industry and in weapons used by the defence forces. Research from Japan has shown that the effects of thermal radiation are reduced by up to 50% by clothing acting as a barrier to radiation. If beta particle emitters come into contact with the skin a beta burn may result and the water gels of the invention may prevent this occurring.

The effects of radiation were observed in Japan and in the Marshall Islanders in 1954 (Source of case studies in Japan and Marshall Islands, Glasstone and Dolan, The effects of nuclear weapons, US Dept. of Defence pubd 1977 ed). Alpha emitters and beta particles can deposit their entire energy within a small sensitive volume of the body tissue causing damage. Particles of greater than 10 micrometers are filtered out by the nose and 95% of 5-10 micron particles are also filtered but the very fine particles under this size reach the lungs causing internal body damage. Alpha particles can be retained in the lungs for a long time and can cause serious injury to lung, liver and bone. In the Marshal islands studies much of the material contaminated food, water, utensils and other objects in the environment.

Because radiological sources are present in hospitals and industrial locations and are also sought for criminal use, widespread contamination of the environment as well as body effects on people and other organisms is possible.

Currently available biological/radiological masks that have been produced for protection against viruses and organisms such as anthrax are constructed to transmit only particles of under 5 microns when the person is breathing. Special filters are also used for heavy contamination situations, e.g. charcoal which absorb or physically hold the hazard so that it does not reach the person's airway. The water gels of the invention may act as a further physical barrier for use in masks.

Moreover, if a water gel layer was combined with, for example, a boron layer a broader range of radiological effects could be preventable. Thus, gamma radiation or neutrons could be absorbed by a water gel barrier comprising a boron layer.

Water gel barriers also provide the added advantage that post contamination clean up is made much simpler. Since the chemical or biological agent may stick to or dissolve within the water gel, clean up can be effected simply by removing the water gel sheet from the structure in question. This forms a further aspect of the invention and hence viewed from a further aspect the invention provides the use of a water gel to protect entities, e.g. structures or organisms against chemical, biological or radiological contamination.

The material may also be used to mitigate contamination after an incident by being applied as a decontamination material, e.g. by unrolling sheets of the material down roads or surfaces.

In some applications there may be several layers to provide various protections from heat and blast with an optional top layer being a throw away contaminatable layer.

The water gel can be formed into any suitable shape or form depending on the nature of the protective barrier desired.

The water gels of the invention can be formulated into sheets using known techniques such as injection moulding or thermal cooling of the material. The width of the material will depend on the nature of the use. Thus, where the water gel is being used to prevent fragmentation of glass in a window, the water gel can be formed into a sheet for use in covering the window. The water gels of the invention may also be used as protective barriers, e.g. sheets on or within buildings or on equipment; Thus, water gel sheets could be used as building cladding, blast curtains or formed into thin sheets for covering equipment such as computers.

When used as a protective layer over building cladding, it is most important that the lower part of the building is protected from the effects of a blast. Thus, the protective water gel barrier may be adhered only to the lower part of a building, e.g. the bottom three floors since this is the area which suffers from the greatest blast impact from a ground based explosion.

The protective water gel barrier may be continued inside the building on partitions or inside walls to strengthen the structural resistance to blast. The material may also be used as a protective surface across the whole facade of a building to protect against explosive pressures from very large explosions or from air-borne contaminants from an explosion.

Water gels may also be formulated as protective blankets, or clothing for personnel. Thus, the barrier could be in a form to protect the eyes, ears or feet, e.g. as shoes. Alternatively, very large sheets of water gel could be produced for covering critical environmental areas, e.g. reservoirs, or iconic targets. Temporary structures, in particular temporary military structures, may be covered with this material to mitigate the impact of explosions on buildings equipment and personnel.

For convenience, the material for permanent or temporary fixing across doors, windows, on horizontal or vertical surfaces etc may be in rolls that can be cut to create barriers. The material may also be extrudable.

The forming of the water gels into desired shapes can be achieved easily using known equipment, e.g. those used in the food industry to make jelly or those used in the pharmaceutical industry to make capsules.

The water gels of the invention can also act to disrupt the flight of projectiles, i.e. can act as armour by protecting against bullets etc.

It is envisaged that the water gels of the invention may mitigate pressure through the shock absorbing characteristics of the gel. Moreover, the gel fibres are envisaged to change the trajectory of a projectile and create drag on the projectile.

The gel may therefore resist the pressure wave of a projectile by absorption thereof. The gel is able to expand during shockwave impact and "bounce back" the pressure wave onto the oncoming projectile or shock wave. This action reduces or eliminates the pressure wave created by the projectile and reduces or eliminates the kinetic shock of the projectile.

The gel also reduces the inherent energy of the projectile through slowing the speed of passage of the projectile through the gel and this reduces the projectile pressure wave on the entity being protected by the gel. The gel also focuses the pressure wave of the projectile back along the trajectory of the projectile thereby creating a pressure effect outside the gel layers and shield material.

Projectiles may be in the form of bullets, rockets or missiles or other projectiles travelling at speeds that may be in excess of 3,500 meters/second.

Thus, the gels of the invention have a range of applications from bullet proof vests and helmets to replacement for sandbags to protect army personnel from enemy fire.

The water gels of the invention may also have utility in the protection of ships from blast or projectiles. Both commercial and military ships have been the recent targets of terrorists and military ships in particular face dangers with mines and missiles. The water gels of the invention may be used to coat either the inside and/or outside of the ship's hull to thereby act as a pressure mitigant. Where a ship has a double hull, the water gel may be used to coat both hulls or used in the cavity between hulls.

The water gel layer employed may be as thin as 2.5 cm and may be applied to the hull using a conventional adhesive. Thicker layers can be applied to parts of the ship where extra protection may be required, e.g. to protect parts of the hull where damage could cause the hull to split or to protect parts of the hull housing weaponry etc.

It is also envisaged that ships could be fitted with permanent or preferably temporary skirts to prevent any damage occurring to the hull at all. The skirts would take the form of vertically suspended panels of water gel made as thin as possible to minimise weight. Such skirts may be suspended from the side of the ship, e.g. using wires, and may prevent attacks on a ship's hull from surface to surface missiles, torpedoes, mines, or terrorists in boats. In view of their weight, these skirts could be employed only on areas of the hull where explosive damage could be critical, e.g. at the centre point of the hull where explosive damage may cause the hull to split.

Also, the skirts could be employed temporarily as a ship passes through potentially dangerous waters, the skirts being removed once the ship returns to safer areas. Thus, skirts could be employed when a ship was in port, near the coastline or in a narrow channel etc but removed in open waters. The skirts create a buffer between the hull and the skirt to mitigate any explosive effects on the hull. Moreover, in view of their make up, the skirts are not visible from afar and are difficult to detect by radar.

The gels could also be used to protect other marine installations such as oil rigs, underwater cables, pipelines, underwater monitoring equipment and could even be used to protect submarine hulls.

The material may also have applications deep underground where tunnels could be lined with the water gels to mitigate the effects of explosions underground. Drilling equipment etc could also be protected.

The water gels can also be moulded to form a protective shell on a vehicle. Military vehicles which carry personnel or equipment are conventionally covered with very thick and hence heavy metal plates to stop incoming small arms fire, rocket propelled grenade rounds, damage from mines and shells. When the water gels of the invention are moulded, e.g. with a fibreglass or polyurethane shell it may be possible to manufacture a light, fast vehicle capable of withstanding damage from these threats. 30 cm of water gel material covering a lightweight body that could stop incoming attacks.

The vehicle chassis could be shaped to minimise the chance of the vehicle being detected by radar. Thus, the external appearance of the vehicle may be similar to the inverted hull of a boat or akin to the shape of an armadillo. The water gels of the invention are inherently hard to see with radar and the combination of the water gel and the special vehicle shape may make the vehicles very difficult to detect.

The material could also be used as a fuselage or wing liner in aircraft. In particular, the hold of an aircraft could be lined with the material to mitigate the effects of an explosion within the hold. Furthermore, cargo containers themselves could be lined with the material, internally or externally.

A still further potential application of the water gels is in space where they could be used to cover space vehicles to protect them from space debris. If a satellite, rocket, space station etc comes into contact with an article of space debris, considerable damage can be done in view of the incredibly high speed of impact. A recent space shuttle accident was caused by damage caused by small parts detaching from the upper portions of the rocket and contacting the lower portion of the shuttle vehicle. Such damage could be minimised if the water gels of the invention where employed as coatings.

It is also envisaged that the water gels of the invention may protect against heat, flame and fire. By definition, the water gels of the invention comprise an aqueous component. For this reason, they are capable of absorbing heat and dousing flame much more efficiently than other pressure impulse mitigation materials. It is a particular advantage of the invention that the water gel pressure impulse mitigation material simultaneously can act to protect against fire.

When exposed to heat, it is envisaged that the water gel may partially or completely melt thereby releasing water to help quench any fire. Moreover, during an explosion, the water gel may first absorb the effects of the explosive blast and heat associated therewith and subsequently melt to prevent associated fire damage.

The water gel barriers of the invention may also serve to protect organisms against flame burns from secondary contact with hot objects. A skin temperature of 70° C. will produce the same type of burn as exposure to 48° C. for a few minutes. Skin burns under clothing depend on the colour, thickness and nature of the fabric and if the fabric ignites. Research has suggested that burns were more severe where an individual wore dark clothing than white clothing because of the reflection of heat by white and light fabrics. In this embodiment the water gel could be combined with a thermal insulating layer to prevent heat transfer to the skin.

The water gel barriers of the invention may also help in the event of a conventional fire, particularly in a building in which the external structure is predominantly made from glass. During a fire in such a building, the metal frame of the building tends to expand and the windows can therefore fall out of their frames. The presence of a water gel will slow down any expansion of the building frame thereby allowing fire-fighters more time in which to control the fire.

The water gel would also act as a heat reducer in wooden buildings.

The water gels of the invention are more effective at mitigating the effects of fire at lower gel concentrations, i.e. higher water concentrations. However, the water gels are more effective at pressure impulse mitigation at higher gel concentrations. It is therefore within the scope of the invention to provide a multilayer barrier comprising water gel layers having varying gel concentrations to provide barriers tailored to mitigate the effects of both fire and pressure.

It is a particular advantage of the material of the invention that it is transparent and hence does not affect the amount of light entering a building when used as a window protector or affect the external appearance of a building when used as a cladding. Fixing the material to a structure can be achieved using conventional techniques. For example, for window protection, the material may be adhered to the window surface (inside and/or outside) using known adhesives such as ceramic bonds or other bonding materials that adhere to wood, concrete or glass surfaces. These materials are readily available through suppliers to dentists for bonding of ceramic veneers to teeth, and in the construction industry for bonding materials together.

It is particularly advantageous if the bond between the water gel sheets and the window is stronger than the fixing holding the window frame into the wall.

Within clothing or where sheets are being bonded together to create large surface areas for protection the use of these industrial bonding agents may create seams that should be stronger than the water gel material and protect large surface areas from the pressure of being split at the seams.

The material could be placed in wall cavities or roof space or secured to the outside of a building by adhesives or in a frame. The person skilled in the art can devise alternative methods of fixation.

Other forms of encapsulation of layers of the water gel material may involve vacuum sealing and the use of hydrostatic films as is known in the art. The gels may be acidic or basic giving rise to further options for fixation.

Thus, the water gels of the invention can simultaneously act against the possible detrimental effects of explosions, projectiles, fire, chemical, radiological or biological leakage.

The invention will now be further described with reference to the following non-limiting examples and FIGS. 1 to 10.

EXAMPLE 1

Explosion Tests

The apparatus employed in the example is shown in Scheme 1. It consists of a 100 mm by 50 mm duct, 2.5 m in length, closed at one end. The gel layer was placed in a holding frame between the open end of the duct and an extension of the duct.

The enclosed portion of the duct (approx 12.5 L) was filled with a 4.3% propane in air mixture and allowed to recirculate for a few minutes prior to igniting the gas with a spark plug. The pressures on either side of the barrier were measure at P1 and P2. The displacement of the gelatine gels were captured using a Phantom High Speed Video Camera. The independent variables were the thickness of the layer (d), and concentration of gel (n).

Gels were made up by mixing an appropriate amount of gelatine obtained from commercial suppliers and tap water. The water gel was formed into a barrier by pouring a hot solution of the gel into a mould and allowing this to cool. The moulded gel was inserted in a holding frame between the duct and a duct extension and secured in place by screwing the extension duct onto the main duct.

The frame thickness was slightly less (approximately 1 mm) than the gel thickness. In screwing the extension duct onto duct slight compression of the gel occurred giving a gas tight seal between the duct and the extension duct.

Results

Figure 1:
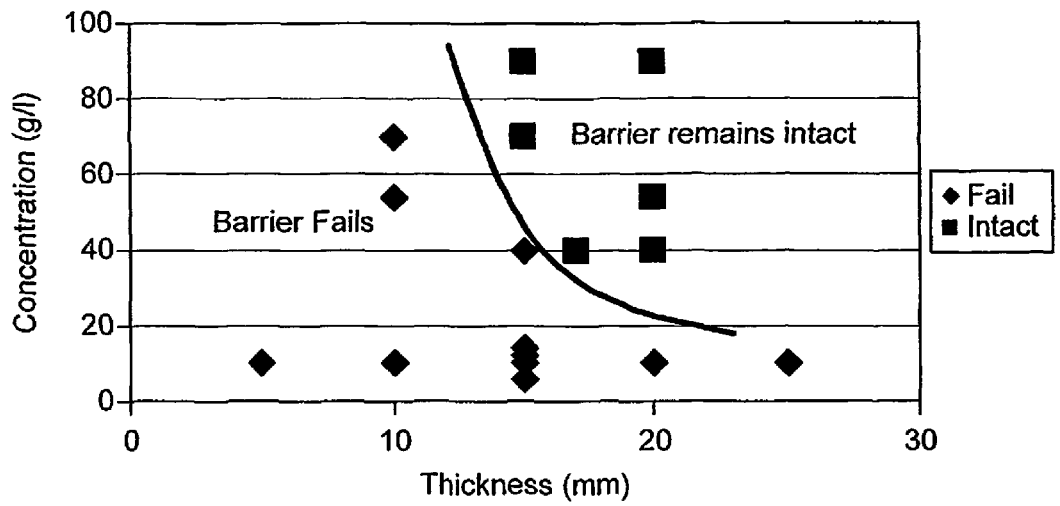
FIG. 1 shows the boundary between failure of the barrier where pressure on one side of the barrier is transferred at a reduced level to the other side of the barrier and those that remained intact where the pressure is retained on one side for the barriers employed in example 1.
Figure 2:
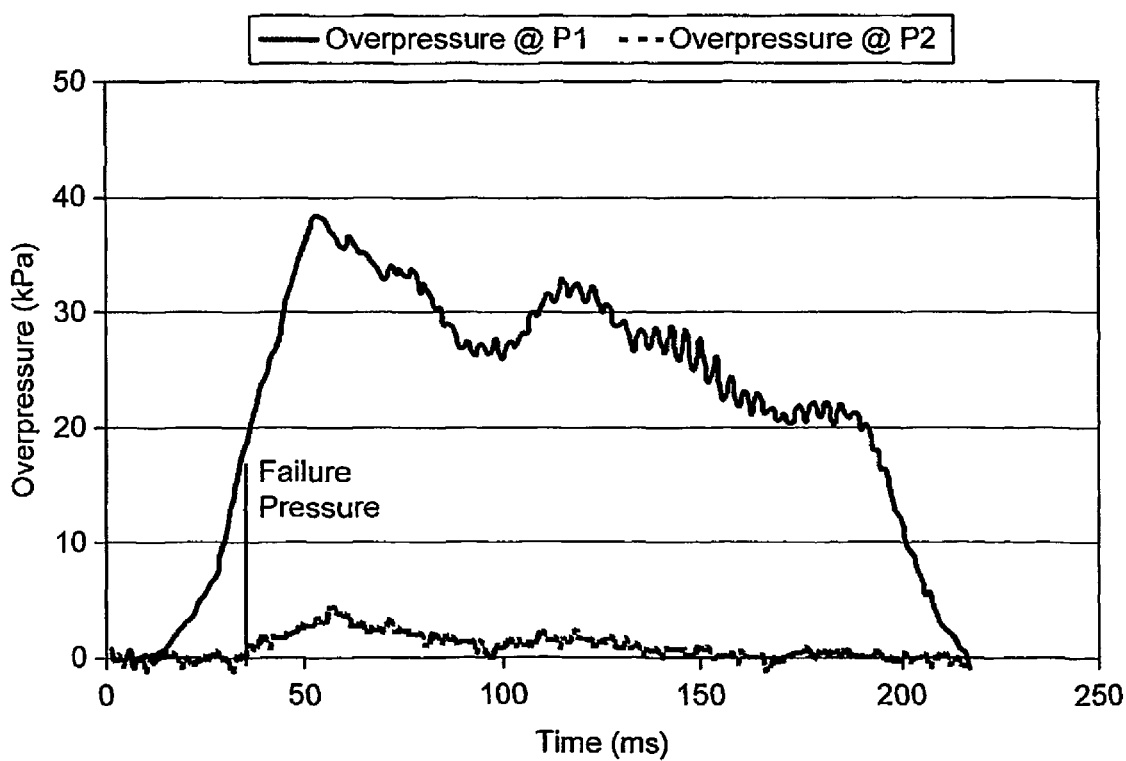
FIG. 2 shows typical pressure curves for a barrier that fails. The pressure at failure was 18.6 kPa. The thickness of the gel was 15 mm at a concentration of 40g/l. Even though the gel failed, the over pressure is markedly reduced outside the barrier. The magnitude of this reduction increased as the concentration of the gel was increased.
Figure 3:
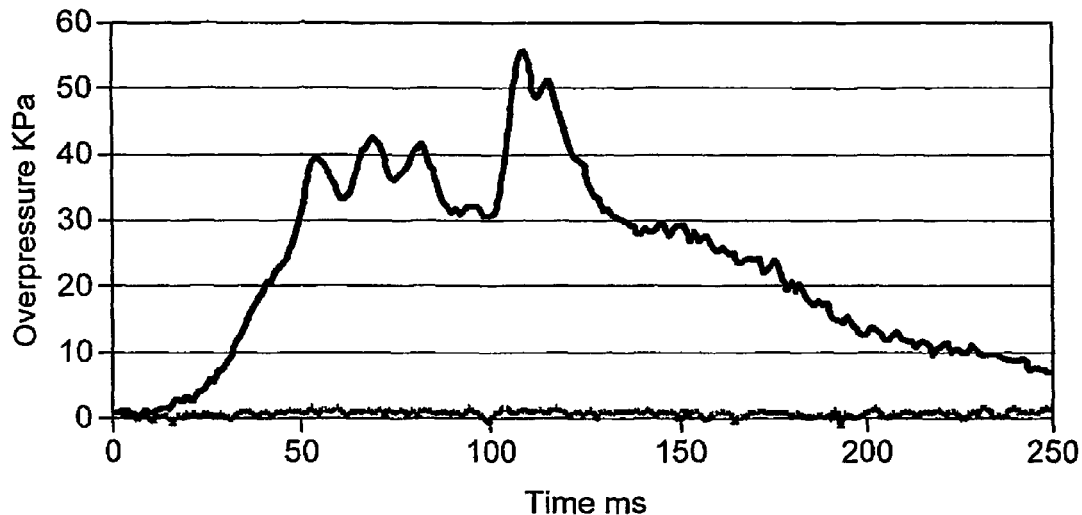
FIG. 3 shows the results of an experiment in which the barrier has a concentration of 90 g/l and is 20 mm thick. The barrier survived the pressure and hence the pressure gauge at P2 is flat.
Figure 4:
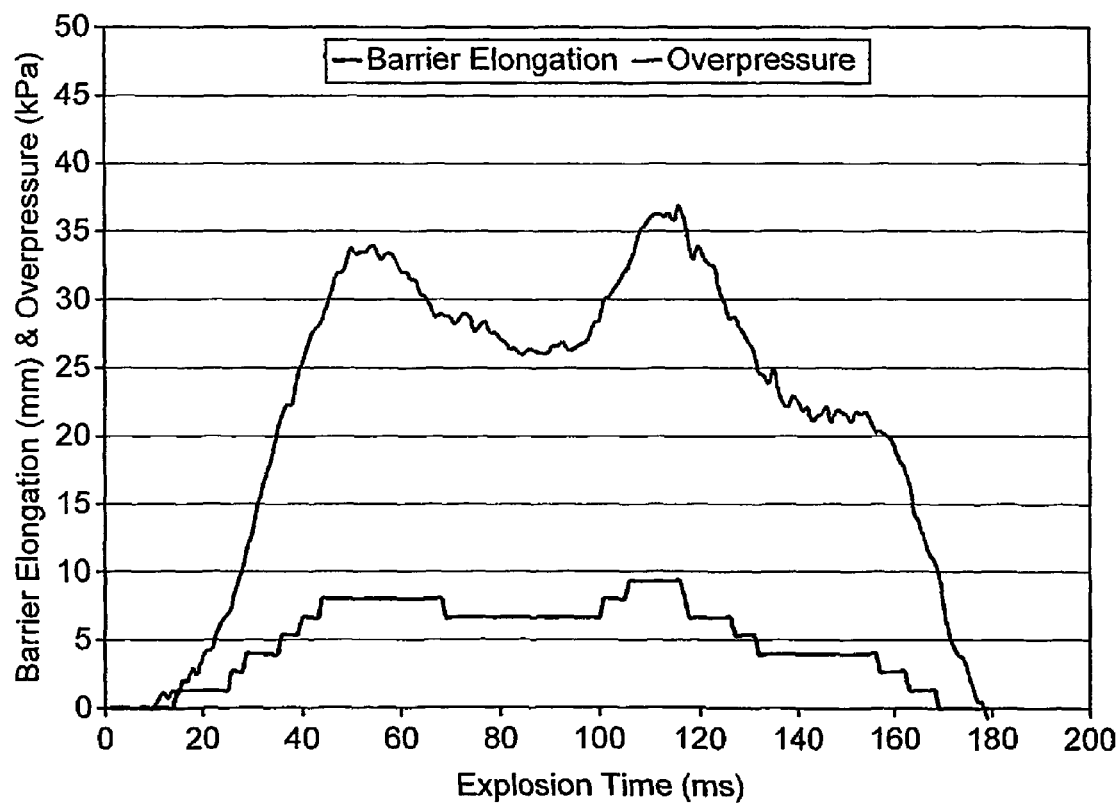
FIG. 4 shows a displacement and overpressure curve for a 20 mm, 40 g/L gelatine barrier. Significant elongation of the barrier occurred but the barrier remained intact.
Figure 5:
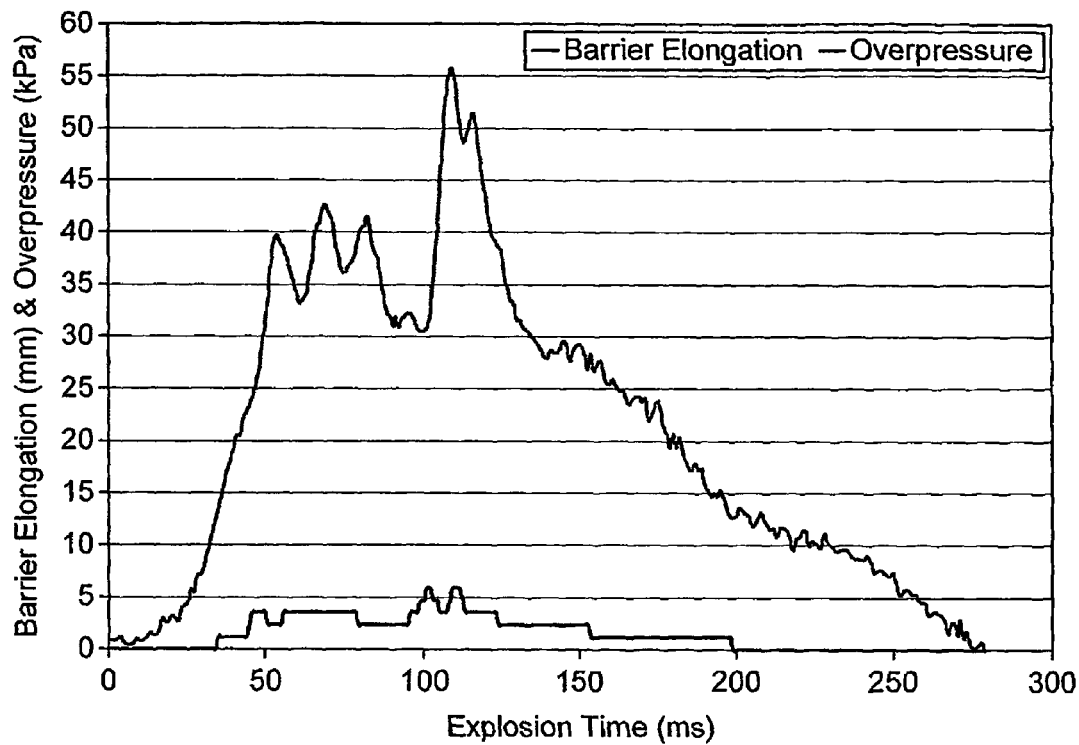
FIG. 5 shows a displacement and overpressure curve for a 20 mm, 90 g/L gelatine barrier. This barrier also remained intact. The deflection of the barrier is less because of the increased stiffness in the barrier.
Figure 6:
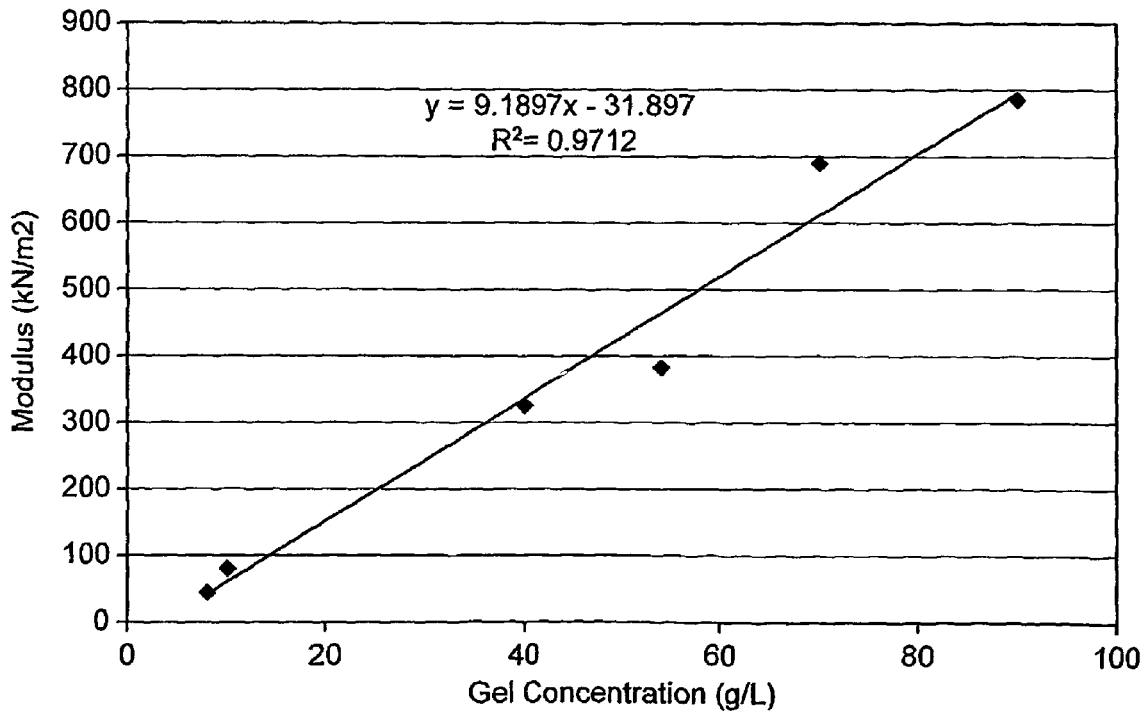
FIG. 6 is a graph of modulus vs gel concentration for the results presented in Example 2.

Table 1 is a summary of the experiments. Generally those gel barriers with a thickness below 15 mm broke when subjected to the overpressure generated by the propane ignition. FIG. 2 which shows the relationship between thickness, concentration and outcome suggests that thicknesses as low as 12 mm would survive this explosion overpressure at higher concentrations. All those at higher concentrations survived the overpressure impulse.

TABLE 1

| Thickness mm | Concentration g/L | Outcome |
|---|---|---|
| 15 | 6 | Failed |
| 5 | 10 | Failed |
| 10 | 10 | Failed |
| 15 | 10 | Failed |
| 20 | 10 | Failed |
| 25 | 10 | Failed |
| 15 | 12 | Failed |
| 15 | 14 | Failed |
| 15 | 40 | Failed |
| 10 | 54 | Failed |
| 10 | 70 | Failed |
| 17 | 40 | Intact |
| 20 | 40 | Intact |
| 20 | 54 | Intact |
| 15 | 70 | Intact |
| 15 | 90 | Intact |
| 20 | 90 | Intact |

The highest concentration of gelatine employed in Example 1 survived pressures of 65 kPa. Threshold values for glass breakage are of the order of 1.5 KPa while cladding on buildings collapses at 30 KPa. Domestic buildings in the UK and US are totally destroyed at about 70 kPa.

EXAMPLE 2

A series of further water gels were prepared as per Example 1. The thickness of the water gel was 20 mm with a varying concentration. The elastic modulus of each gel was measured by a texture analyser in which the strain of the gel was kept constant while change in stress was recorded. The maximum stress is shown in

TABLE 2

| Gel Concentration(g/L) | Modules (kN/m2) |
|---|---|
| 8 | 44.0 |
| 10 | 80.3 |
| 40 | 326 |
| 54 | 383 |
| 70 | 690 |
| 90 | 784 |

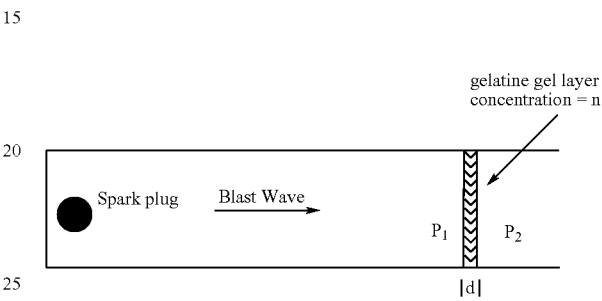

EXAMPLE 3

Ballistics Tests

Experimental Conditions:

The polyethylene oxide solution used in these experiments was a 1.1% solution made by directly pouring Polyox W301 into water.

The Gel was made from 200 bloome gelatine supplied by Gelitia Australia by heating 30% by weight in water to 65° C., ensuring that all the gelatine had dissolved before pouring into the moulds. Moulds were made from standard polypropylene food containers of 1 liter volume.

The fabric used in the tests was 70% Polyethylene shade cloth. Random mat fibreglass is also employed.

Figure 7:
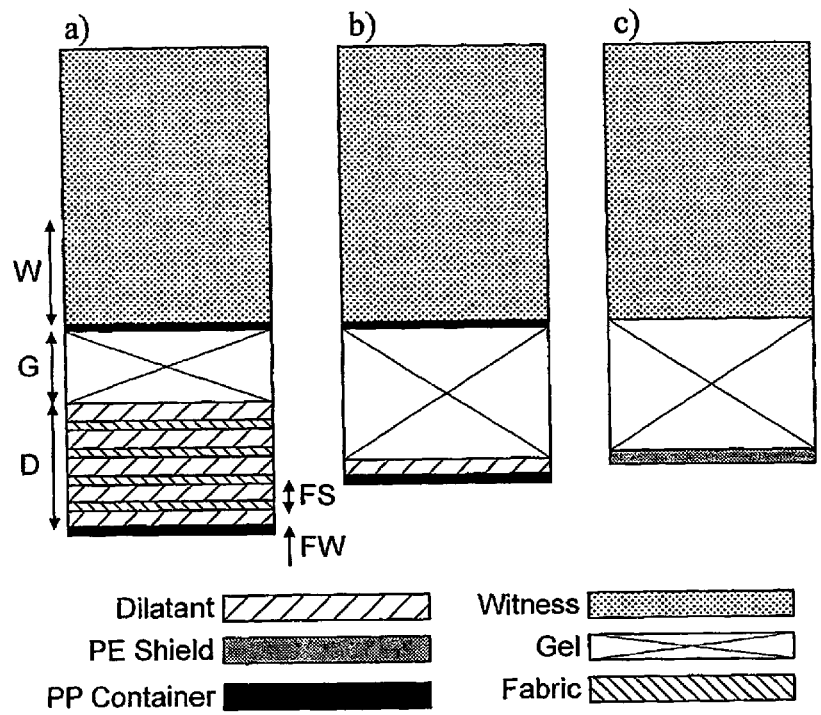
FIG. 7 shows the test samples of example 3.

A number of tests samples were constructed as shown schematically in FIG. 7. FIG. 7a shows the configuration of tests involving layers of Polyethylene shade cloth with 70% closed area or random mats of fibreglass embedded within a 1% polyethylene oxide solution held within a polyethylene bag encased in a 30% gelatine/water gel. The complete test sample was held within a polypropylene container of 0.1 mm thickness. The number of layers of fabric varied between 1 and 8 with the distance between each layer separated by wooden spacers of 2.5 mm thickness. The distance between the container and the first layer could be varied as could the layer separation.

The second configuration shown in FIG. 7b consisted of a 1% polyethylene oxide solution against the gel layer and contained within a polypropylene container.

The third configuration involved a 3 mm high density polyethylene sheet against a sample of the solid gel. All configurations used a plasticine witness as a measure of the energy remaining in a shell.

Figure 8:
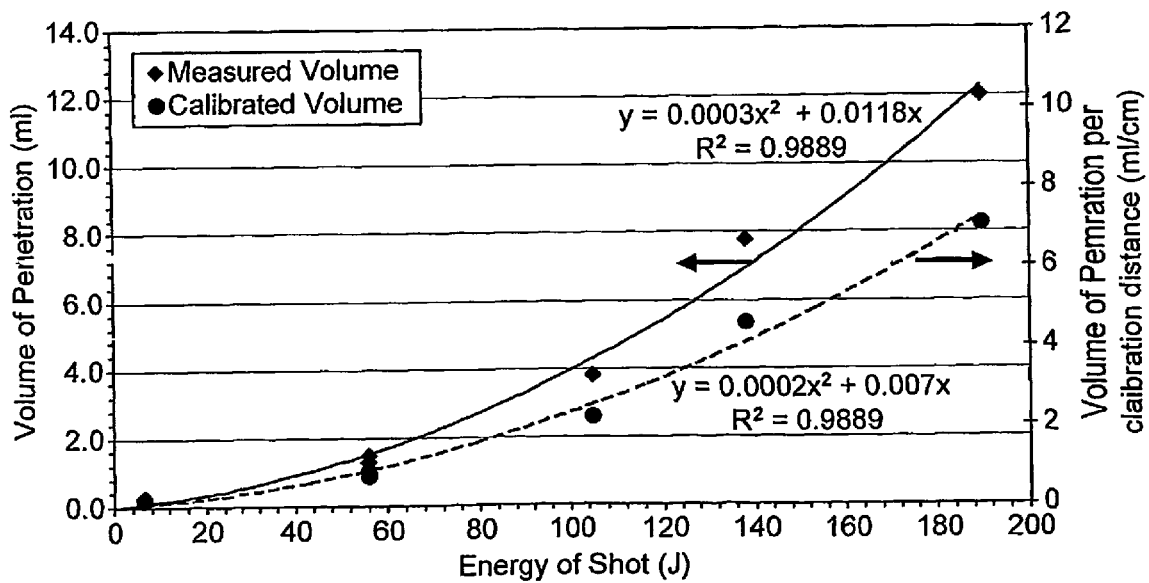
FIG. 8 shows the calibration energy curve from Example 3.

Calibration tests were undertaken in which the various shot types were fired directly into the plasticine witness. The average values of penetration depth (measured from a calibrated stick placed in the hole) and volume (measured by injecting water from a calibrated syringe) are shown in Table 3. A correlation between the energy in the shot and the volume was developed and is shown in FIG. 8.

| Shot Type | Energy J | Momentum kg · m/s | Witness Penetration cm | Witness Volume ml |
|---|---|---|---|---|
| BB | 6 | 0.07 | 1.7 | 0.3 |
| 22Z | 56 | 0.46 | 7.1 | 1.5 |
| 22Z | 56 | 0.46 | 6.7 | 1.3 |
| 22 Short | 105 | 0.63 | 9.6 | 3.8 |
| 22 long | 138 | 0.85 | 12.8 | 7.8 |
| 22 High | 190 | 0.99 | 8.1 | 12.0 |

Table 3 Calibration Tests directly into the Plasticine Witness. Projectile Characteristics are give below in Table 4

TABLE 4

| Brand | Calibre | Bullet type | Mass grams | Velocity m/s | Energy J | Momentum Kg · m/s |
|---|---|---|---|---|---|---|
| Copperhead | 0.177 | Iron Ball Bearing | 0.38 | 183 | 6 | 0.07 |
| Winchester 22Z | 0.22 | Zimmer | 1.88 | 244 | 56 | 0.46 |
| Winchester 22 short | 0.22 | Short | 1.88 | 334 | 105 | 0.63 |
| CCI Standard Velocity | 0.22 | Standard | 2.59 | 326 | 138 | 0.85 |
| Winchester High Velocity | 0.22 | Lead 40 GR | 2.59 | 383 | 190 | 0.99 |

One problem encountered was the variability of hardness of the plasticine witness which varied according to the temperature. In order to establish a more reliable marker for the energy absorbed by the witness, a ball bearing was shot into each plasticine witness and the energy was related to the volume per unit penetration distance of this calibration shot. This calibrated energy curve is also shown in FIG. 8 on the secondary axis.

(sample 1). The latter had been made by first dry mixing the Gel and POE before adding to water 10 and heating to 65° C. The results are shown in Table 5.

The mixture showed increased lubricosity compared with the straight Gel and performed marginally worse.

A further two sets of tests involved a fibreglass layer cast in the straight gel mixture in a polypropylene container with (sample 16) and without (sample 7) a 2-3 mm 1% Polyox solution against one PP side. The results are also shown in Table 5.

The presence of the fibreglass doubles the average dissipation in the gel compared with the pure gel and fibres can be clearly seen adhering to the bullet. The efficiency is increased by a further 20% when a thin layer of Polyox is placed before the gel/fibre mix. In this particular test the bullet was observed to have bounced back about 1.5 cm within the gel. It suggests that some of the polyox had adhered to the bullet and acted like a spring on the bullet. The efficiency in stopping the 22 short bullet increased to over 200% with the polyox and fibre compared with the straight gel (This compares with an increase of 120% for the 22Z).

TABLE 5

| Sample | Shot Type | Gel depth (G) cm | Witness Penetration(W) cm | Witness Volume/ calibration depth ml/cm | Energy Dissipated in witness J | Energy Dissipated by test piece J | Ave Energy Dissipation per cm Gel J/cm |
|---|---|---|---|---|---|---|---|
| 2 | 22Z | 5.5 | 3 | 0.65 | 45.2 | 10.7 | 1.9 |
| 2 | 22Z | 15.5 | 0 | 0.00 | 0.0 | 55.9 | 5.1 |
| 2 | 22 Short | 15.5 | 0.1 | 0.06 | 7.4 | 97.3 | 6.3 |
| 1 | 22Z | 5.6 | 3.7 | 0.90 | 55.8 | 0.1 | 0.0 |
| 1 | 22Z | 15.5 | 0.1 | 0.06 | 7.4 | 48.5 | 3.1 |
| 1 | 22 Short | 15.5 | 1 | 0.18 | 18.2 | 86.5 | 5.6 |
| 7 | 22Z | 5.5 | 0 | 0.00 | 0.0 | 55.86668569 | 10.2 |
| 16 | 22Z | 5.5 | 0 | 0 | 0 | 55.86668569 | 11.2 |
| 16 | 22 Short | 5.5 | 0 | 0 | 0 | 104.6649263 | 19.7 |
| 16 | 22 Long | 5.5 | 3 | 0.61538462 | 43.8 | 94.04863888 | 16.5 |

The first series of tests were performed on 2 samples: A 30% gel mixture in a polypropylene container (sample 2) and a 30% Gel plus 1% Polyethylene oxide in a PP container A series of tests using 22Z bullets were undertaken against the test configuration shown in FIG. 7a. The results are shown in Table 6 with the results ranked increasing degree of energy dissipation by the test piece. The first observation to be made was that all samples except sample 4 and sample 5 had enlarged entry holes. The front PP container had shattered and had been projected outwards by a shockwave formed from the bullet going through the sample.

The straight gel of thickness 5.5 cm dissipated 10.7 J and this is lower than all the values in Table 6 except for sample 4. It suggests that a combination of POE and Gel does increase the effectiveness of energy dissipation. Those materials having closely spaced layers at the front surface performed better than larger spacings or where the material was further away from the front surface. Indeed the closely spaced PE sheets stopped the bullet within the gel.

TABLE 6

Tests involving different fabric configuration in Polyox.

| Sample | Gel depth (G) cm | Polyox depth (D) cm | Fabric Type | No Fabric Layers | Interlayer distance cm | distance to first layer in polyox cm | Witness Penetration(W) cm | Witness Volume/ calibration depth ml/cm | Energy Dissipated in witness J | Energy Dissipated by test piece J |
|---|---|---|---|---|---|---|---|---|---|---|
| 4 | 2 | 3.5 | PE | 7 | 0.5 | 0 | 4.5 | 1.00 | 59.7 | −3.8 |
| 13 | 2.8 | 2.7 | PE | 1 | 0 | 1.5 | 3 | 0.62 | 43.8 | 12.1 |
| 9 | 2.5 | 3 | PE | 4 | 0.5 | 1 | 3.6 | 0.53 | 39.5 | 16.4 |
| 14 | 0.2 | 5.3 | PE | 7 | 1 | 0 | 3.3 | 0.46 | 35.8 | 20.1 |
| 5 | 4 | 1.5 | Fibreglass | 8 | 0.1 | 0 | 1.7 | 0.37 | 30.8 | 25.1 |
| 11 | 3.5 | 2 | PE | 4 | 0.25 | 0 | 0 | 0.00 | 0.0 | 55.9 |

EXAMPLE 4

In the final series of tests, the various projectiles were fired through a 3 mm polyethylene shield directly into the witness. This was repeated with a 5.5 cm block of gel placed in contact with the shield as shown in FIG. 7c. The results are shown in Table 7. The first three rows correspond to firing through only the shield into the witness.

The shield has some effect on dissipating energy from the bullet: with the 22Z bullet, the shield dissipated 40% of the energy without deforming the bullet: 83% was dissipated with the 22 Short bullet with the shield disrupting the flight as the bullet entered the witness on its side and continued to tumble in the witness; 52% was dissipated by the 22 Long bullet with the bullet entering normally but tumbling forming a cavern within the witness.

When the gel was directly behind the shield, all the bullets except the 22 Short failed to penetrate the witness. In the case of the 22 Short bullet, the bullet had entered sideway to a depth of less than 3 mm and a volume of less than 0.1 ml. The shells disintegrated with the 22 long and 22 high velocity bullets. Although some fragments got through the shield into the gel, they had only penetrated the gel a few millimeters. The 22Z bullets both failed to penetrate the shield.

TABLE 7

Gel/Shield test results

| Shot Type | Gel depth (G) cm | Witness Penetration(W) cm | Witness Volume/ calibration depth ml/cm | Energy Dissipated in witness J | Energy Dissipated by test piece J |
|---|---|---|---|---|---|
| 22Z | 0 | 2.3 | 0.42 | 34 | 22 |
| 22 short | 0 | 2 | 0.17 | 17 | 87 |
| 22 long | 0 | 8 | 1.17 | 66 | 72 |

TABLE 7-continued

Gel/Shield test results

| Shot Type | Gel depth (G) cm | Witness Penetration(W) cm | Witness Volume/ calibration depth ml/cm | Energy Dissipated in witness J | Energy Dissipated by test piece J |
|---|---|---|---|---|---|
| 22Z | 5.5 | 0 | 0.00 | 0 | 56 |
| 22Z | 5.5 | 0 | 0.00 | 0 | 56 |

TABLE 7-continued

Gel/Shield test results

| Shot Type | Gel depth (G) cm | Witness Penetration(W) cm | Witness Volume/ calibration depth ml/cm | Energy Dissipated in witness J | Energy Dissipated by test piece J |
|---|---|---|---|---|---|
| 22 Short | 5.5 | 0.3 | 0.08 | 9 | 95 |
| 22 long | 5.5 | 0 | 0.00 | 0 | 138 |
| 22 high | 5.5 | 0 | 0.00 | 0 | 190 |

EXAMPLE 5

A number of ballistic experiments were undertaken with a 0.223 rifle in which the velocity of the incoming and exiting projectile against a gel target was measured. The target consisted of 5 mm or 10 mm of fibre set in gel in front of a 30% gelatin water gel layer of 150 mm or 145 mm thickness respectively. The 0.223 projectile had an average velocity of 3345 ft/s (1020 m/s) with an energy of 1850 J.

Figure 9:
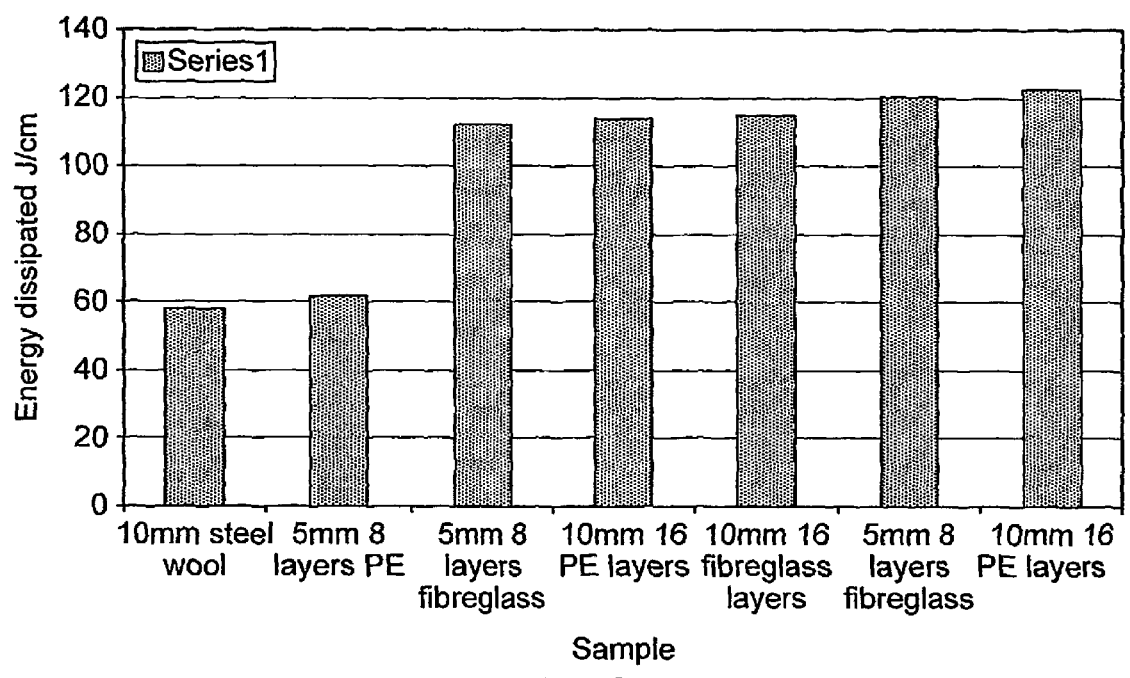
FIG. 9 shows the average energy dissipated per unit depth of gel ranked in increasing order of dissipation for example 5.

The total thickness of the fibre and gel allow calculation of the average energy dissipated per unit length of gel. FIG. 9 shows the average energy dissipated per unit depth of gel ranked in increasing order of dissipation. The five highest ranking samples represent over 95% of the energy being absorbed by the respective samples and even the lowest ranked sample absorbed over 50% of the energy.

EXAMPLE 6

Figure 10:
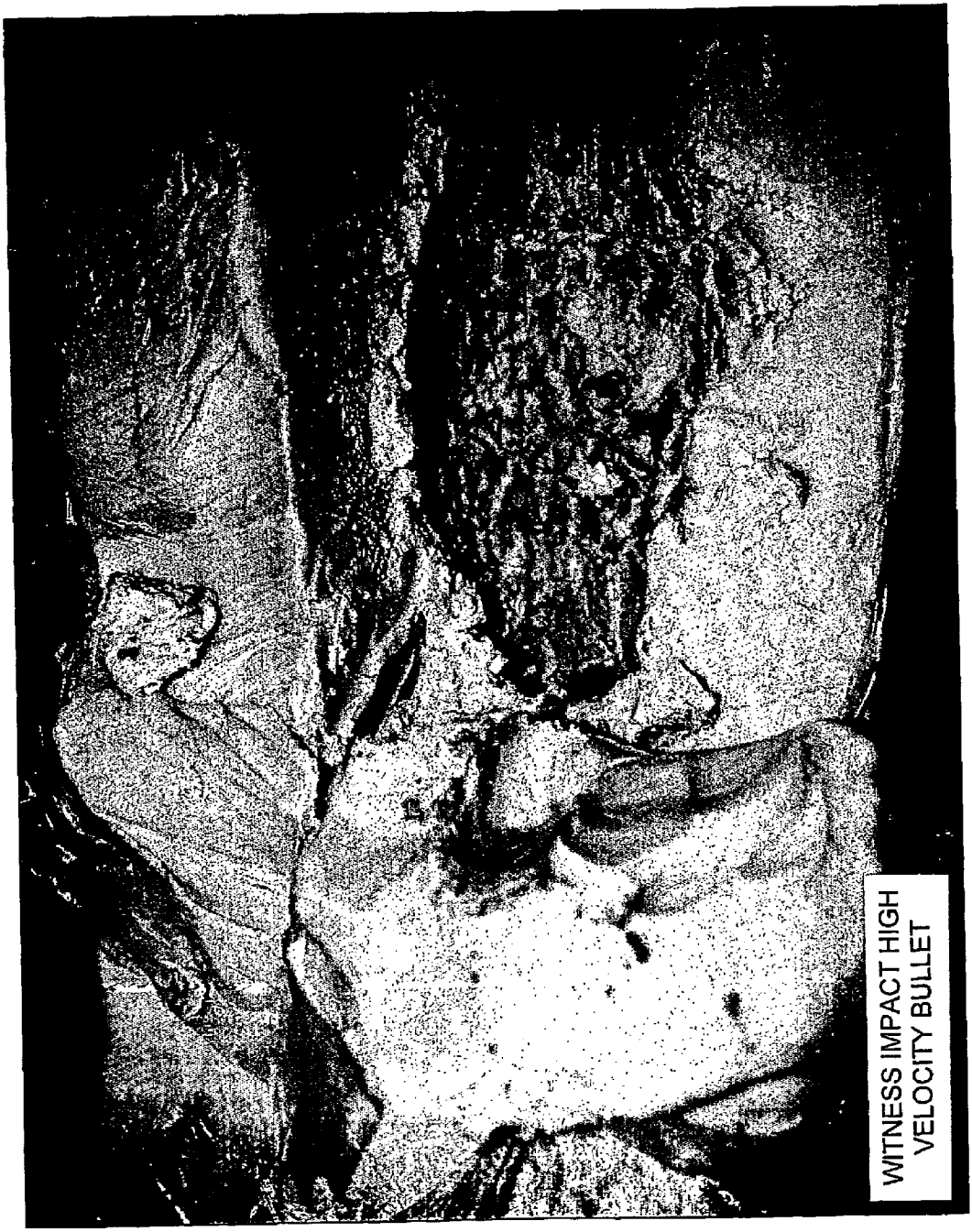
FIG. 10 is an image of a high velocity bullet in a witness.
Figure 11:
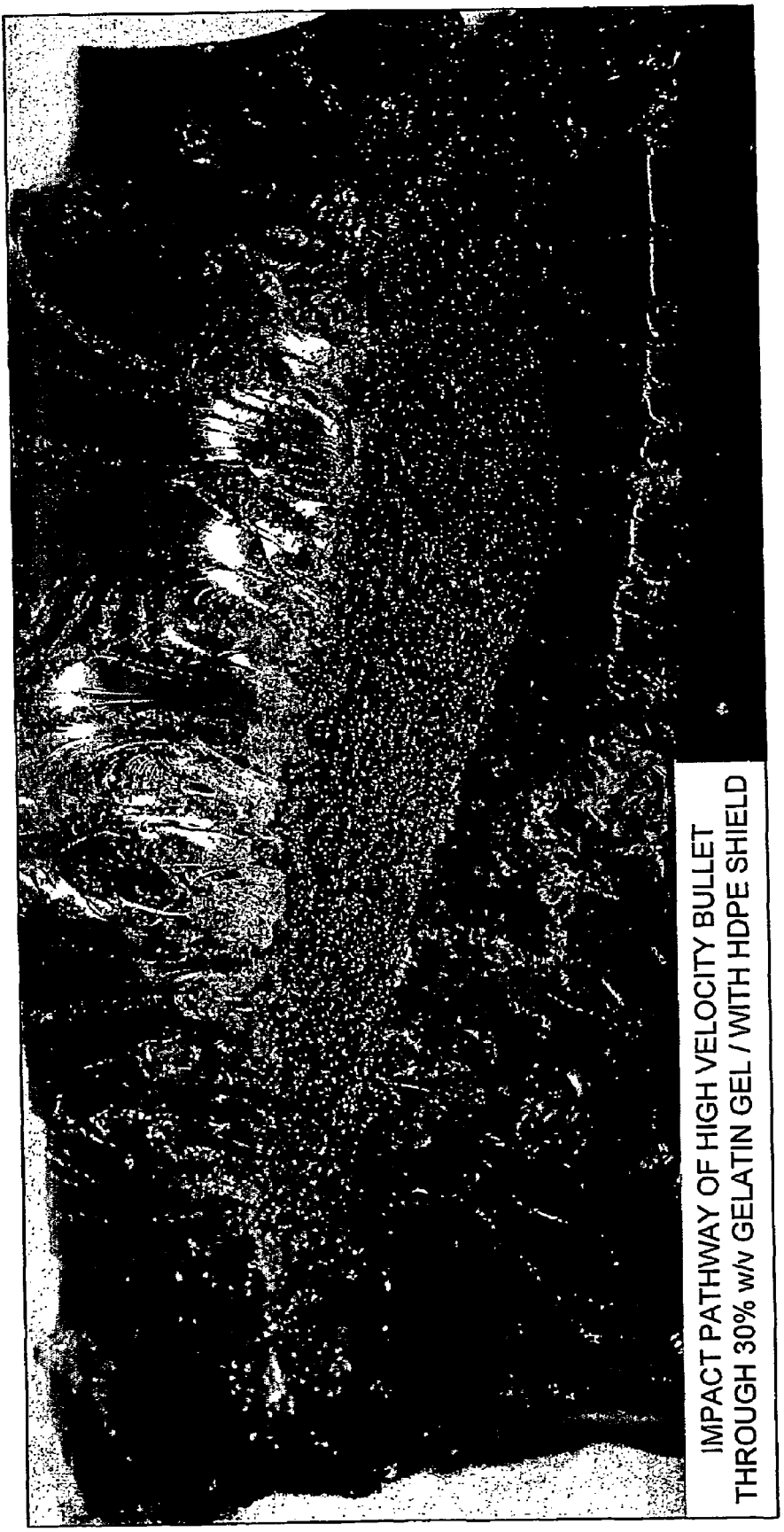
FIG. 11 is an image of a gel in which has been fired a high velocity bullet.

FIGS. 10 and 11 show the result of firing a high velocity bullet >2,500 ft/s into witness material (x50 density of gel). Bullet entry occurs from the right of the image. The witness material block was around 30 cm by 20 cm by 20 cm. The bullet (in fragments) penetrated approx 15 cm into block.

The second image (FIG. 11) is of a 20 cm thick 30% gelatin gel with a HDPE shield. The gel has been cut into a transverse section to view bullet pathway through gel. The bullet enters from the left of the image. After approximately 5 cm penetration the bullet pathway starts to expand (as the bullet begins to tumble in the gel) and is deflected from its initial trajectory and exits gel some way below its entry level. It is also interesting that the impact into the witness looks entirely different from that of the impact in the gel.

The invention claimed is:

1. A method for protecting an entity from the effects of an explosion or from the effects of contact with a projectile comprising covering at least a part of said entity in a barrier comprising a water gel formed from gelatin and water wherein the concentration of gelatin in said water gel is 3 to 40% wt.

2. A method as claimed in claim 1 wherein the concentration of gelatin in said water gel is 5 to 25% wt.

3. A method as claimed in claim 1 to protect an entity from the effects of an explosion.

4. A method as claimed in claim 1 to mitigate the effects of contact with a projectile.

5. A barrier comprising a water gel layer in which said water gel comprises gelatin and water wherein the concentration of gelatin in said water gel is 3 to 40% wt and a polymer layer, a metal layer, a ceramic layer, a fabric layer, a fiberglass layer, a dilatant layer or mixtures of such layers.

6. A barrier as claimed in claim 5 comprising a dilatant layer containing a polyethylene oxide layer.

7. A barrier as claimed in claim 5 comprising a layer of fire retardant material, a layer of material impervious to chemicals, radioactivity or biological agents.

8. A barrier to protect against the effects of an explosion or the effects of contact with a projectile comprising gelatin and water, wherein the concentration of gelatin in the water is at least 3 to 40% w/w.

9. A ship or vehicle comprising a barrier as claimed in claim 5.

* * * * *